(12) United States Patent
Yoshida

(10) Patent No.: US 6,260,135 B1
(45) Date of Patent: *Jul. 10, 2001

(54) PARALLEL PROCESSING UNIT AND INSTRUCTION ISSUING SYSTEM

(75) Inventor: Takeshi Yoshida, Kanagawa-ken (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,802

(22) Filed: Nov. 14, 1997

(30) Foreign Application Priority Data

Nov. 15, 1996 (JP) ................................................ 08-305045

(51) Int. Cl.⁷ ........................................................ G06F 9/30
(52) U.S. Cl. ............................................................... 712/214
(58) Field of Search ............................. 712/214, 23, 216

(56) References Cited

U.S. PATENT DOCUMENTS 5,561,784 * 10/1996 Chen et al. ........................... 395/484
5,699,537 * 12/1997 Sharangpani et al. ............... 395/393

OTHER PUBLICATIONS

Gurindar Sohi, Instruction Issue Logic for High-Performance, Interruptible, Multiple Functional Unit, Pipelined Computer; IEEE 1990.*

Val Popescu, The Metaflow Architecture; IEEE, 1991.*

* cited by examiner

Primary Examiner—David Y. Eng
(74) Attorney, Agent, or Firm—Foley & Lardner

(57) ABSTRACT

A parallel processing unit employs a small-scale instruction issuer and achieves a high-speed operation. The parallel processing unit has an instruction issuer for issuing instructions with source data to processors, a data holder for holding the source data, and a data state holder for holding the state of data that is required by the instruction issuer. Resultant data from the processors are sent to the instruction issuer through a data forwarder when the resultant data are sent to the data holder. The resultant data serve as the source data. The data state holder holds an address of the data holder where a piece of resultant data is stored, as well as a processor number that is related to the address and specifies one of the processors that provides the resultant data. The instruction issuer refers to the processor number when fetching, as source data, data transmitted through the data forwarder.

7 Claims, 11 Drawing Sheets

PARALLEL PROCESSING UNIT AND INSTRUCTION ISSUING SYSTEM

BACKGROUND OF THE INVENTION

1. Field of the Invention

The present invention relates to a parallel processing unit such as a microprocessor employing a data forwarding technique, and an instruction issuing system for the parallel processing unit.

2. Description of the Prior Art

Recent microprocessors try to improve processing efficiency by increasing operation frequencies, which is realized by increasing the number of stages in each pipeline and by issuing instructions to the pipelines at increased pitches. Increasing the instruction issuing pitches, however, elongates a latency time between the issuance of an instruction and the time when a resultant data of the instruction is ready for use for the next instruction. This results in deteriorating processing efficiency when a given instruction is dependent on a resultant data of the preceding instruction.

To shorten such a latency time and improve processing efficiency, a data forwarding technique is used. This technique writes the resultant data of a given instruction into a data holder, and at the same time, transfers the resultant data to an instruction issuer that issues instructions to be processed next, to save the time for writing and reading data to and from the data holder.

This technique also employs a data state holder that holds the data dependence of a given instruction. A typical example of the data state holder is a scoreboard. The scoreboard is a register to store an address of the data holder at which presently processed data is going to be stored. If the address of data required by a given instruction agrees with an address stored in the scoreboard, the given instruction is dependent on presently processed data, and therefore, the given instruction will not be issued until the data in question is completely processed and ready for use.

High-performance microprocessors employ a parallel processing technique such as a superscalar architecture to simultaneously issue and execute a plurality of instructions, to improve IPC (instructions per clock). They also employ, instead of an in-order instruction issuing technique that issues a stream of instructions in order, an out-of-order instruction issuing technique that issues a stream of instructions out of order if there is no data dependence among the instructions, to improve processing efficiency.

If a first instruction is queued due to data dependence, the in-order instruction issuing technique also queues a second instruction that follows the first instruction. On the other hand, the out-of-order instruction issuing technique issues the second instruction before the first instruction, if the second instruction has no data dependence.

Since the out-of-order instruction issuing technique issues instructions without regard to the order of the instructions, a hind instruction may be processed before a fore instruction. This may happen even in the in-order instruction issuing technique when processors having different processing periods are used. For example, it will occur when an adder having a single pipeline stage and a multiplier having three pipeline stages are used. If the order of instructions after their execution is different from a stream of the instructions, a problem will occur when writing results of the executed instructions into the data holder. In particular, if an exception interrupt occurs, it will be difficult to restore processing conditions. A standard technique to solve this problem is to use a reorder buffer, which rearranges the results of the execution of instructions according to a stream of the instructions and writes the rearranged results into the data holder. The execution results are also forwarded to an instruction issuer so that they are used by the next instructions.

FIG. 1 is a block diagram showing a parallel processing unit according to a prior art employing the techniques mentioned above.

An instruction cache 100 stores instructions, which are executed in parallel by processors 110, 111, and 112.

Each instruction read out of the instruction cache 100 is once stored in a latch 10A. Thereafter, a register number of source data of the instruction is transferred to a register file 104, a scoreboard 105, and a reorder buffer 106. The register file 104 and scoreboard 105 correspond to the data holder and data state holder mentioned above.

The register file 104 stores resultant data provided by the processors 110 to 112. The scoreboard 105 stores register numbers of the register file 104. The reorder buffer 106 rearranges resultant data provided by the processors 110 to 112 according to an instruction stream and writes the rearranged data into the register file 104.

If valid data for a given register number is in the register file 104 and reorder buffer 106, the data is sent to an instruction issuer 107. The instruction issuer 107 issues instructions with source data to the processors 110 to 112 according to the out-of-order instruction issuing technique.

Data from the register file 104 and reorder buffer 106 are stored in an instruction queue (FIG. 2) incorporated in the instruction issuer 107. The instruction queue has, for each instruction, a data field and a validity flag Vi that indicates whether or not data in the data field is valid. If the flag Vi indicates invalidity, the instruction issuer 107 monitors addresses and data coming through a data forwarding path 108.

The processors 110 to 112 simultaneously fetch instructions from the instruction issuer 107, execute them, and send results and their register numbers to the reorder buffer 106 as well as to the instruction queue through the path 108.

This parallel processing unit has a problem that load on the instruction issuer 107 becomes heavier as the number of simultaneously issued instructions increases.

This problem will be explained with reference to FIG. 2, which is a block diagram showing the instruction queue incorporated in the instruction issuer 107.

The instruction queue has comparators whose number is at least equal to the number of the processors 110 to 112. Each of the comparators corresponds to source data for an instruction stored in the instruction queue. In FIG. 2, there are three comparators 201, 202, and 203 for the processors 110, 111, and 112. The comparators 201 to 203 compare resultant data addresses, i.e., resultant data register numbers sent through the path 108 with a source register number of a queued instruction. Based on comparison results, a select signal generator 204 generates a select signal S204. According to the select signal S204, a selector 205 selects a piece of data among those sent through the path 108. The comparison results are also sent to an OR gate 206, which provides an enable signal EN, to set/reset a validity flag Vi of the queued instruction. This arrangement involves a large number of comparators and a long path to select data, to extend a delay time.

Namely, the comparators 201 to 203 compare addresses, i.e., register numbers provided by the processors 110 to 112 with a source data address, i.e., a source data register number of a queued instruction. If one of the register numbers from the processors 110 to 112 agrees with the source data register number, data from the processor that provides the agreed register number is fetched from the path 108 through the selector 205 and is used as source data for the queued instruction. Then, the queued instruction is issued to one of the processors 110 to 112. In practice, data forwarding sources to the instruction queue of the instruction issuer 107 are not only the processors 110 to 112 but also the reorder buffer 106 and dummy pipelines. The dummy pipelines are connected to the processors 110 to 112, to reduce the scale of the reorder buffer 106. In this way, there are many data forwarding sources to the instruction queue.

If the register file 104 is of 32 words, each comparison operation needs a 5-bit comparator. If a register renaming technique for changing addresses is employed to reduce queuing and improve processing efficiency, each comparator must have a larger number of bits. This results in increasing load on the instruction issuer 107, and therefore, the instruction issuer 107 must have larger scale and faster processing speed.

SUMMARY OF THE INVENTION

To solve these problems, an object of the present invention is to provide a parallel processing unit having a small-scale instruction issuer and a high processing speed.

Another object of the present invention is to provide an instruction issuing system that improves the operation speed of a parallel processing unit.

In order to accomplish the objects, a first aspect of the present invention provides a parallel processing unit having processors for executing instructions in parallel, an instruction issuer for issuing instructions with source data to the processors, a data holder for holding the source data, a data state holder for holding the state of data required by the instruction issuer when issuing instructions, and a data forwarder for forwarding resultant data from the processors directly to the instruction issuer when the resultant data are sent to the data holder. The resultant data may serve as the source data. The data state holder holds an address of the data holder where a piece of resultant data is stored, as well as a processor number that is related to the address and specifies one of the processors that provides the resultant data. The instruction issuer refers to the processor number when receiving, as the source data, data transmitted through the data forwarder.

When an instruction is read out of an instruction cache, a source data address of the instruction is sent to the data holder and data state holder, a resultant data address of the instruction is sent to the instruction issuer and data state holder, and an instruction code of the instruction is sent to the instruction issuer. The source data address specifies a position in the data holder where source data for the instruction is present or is going to be stored. The resultant data address specifies a position in the data holder where a resultant data of the instruction is stored after the execution of the instruction. If the data state holder indicates that the source data is in the data holder, it is transferred to the instruction issuer. If the source data is being processed, a processor number of the processor that is processing the source data is sent to the instruction issuer. The instruction issuer keeps the instruction code, resultant data address, and source data, if available. If the source data is not available, the instruction issuer holds, in an instruction queue, the processor number and source data address instead of the source data. Thereafter, the instruction issuer uses the processor number to select the source data from data sent through the data forwarder. At this time, the data state holder sets a flag at the resultant data address, to indicate that data at the resultant data address is in process. In this way, if a queued instruction is not provided with necessary source data, the instruction issuer retrieves a processor number from the data state holder, and with the use of the processor number, fetches the source data from the data forwarder.

A second aspect of the present invention provides a parallel processing unit having processors for executing instructions in parallel, an instruction issuer for issuing instructions with source data to the processors, a data holder for holding the source data, a data state holder for holding the state of data required by the instruction issuer when issuing instructions, and a data forwarder for forwarding resultant data from the processors directly to the instruction issuer when the resultant data are sent to the data holder. The resultant data may serve as the source data. The data state holder holds an address of the data holder where a piece of resultant data is stored, as well as a processor number that is related to the address and specifies one of the processors that provides the resultant data. The instruction issuer has a data selector for selecting, according to a given processor number, a piece of resultant data among those sent from the processors through the data forwarder, an address selector for selecting, according to the given processor number, a resultant data address for storing the selected resultant data, among those sent from the processors through the data forwarder, and an address comparator for comparing the selected resultant data address with the address of required source data. If the addresses agree with each other, the selected resultant data is kept as the source data.

If a queued instruction is not provided with necessary source data, a processor number stored for the queued instruction is used as a select signal to the address selector and data selector. The address selector selects, according to the processor number, one of resultant data addresses sent through the data forwarder, and the comparator compares the selected address with the address of the source data. If the addresses agree with each other, data selected by the data selector according to the processor number is stored as the source data in the queued instruction.

When the instruction issuer issues an instruction with source data to one of the processors in the first and second aspects, the instruction issuer sends a processor number of the processor and a resultant data register number to the data state holder.

Then, the data state holder stores the processor number in relation to the register number.

A third aspect of the present invention provides a parallel processing unit having processors for executing instructions in parallel, an instruction issuer for issuing instructions with source data to the processors, a data holder for holding the source data, a data state holder for holding the state of data required by the instruction issuer when issuing instructions, and a data forwarder for forwarding resultant data from the processors directly to the instruction issuer when the resultant data are sent to the data holder. The resultant data may serve as the source data. The data state holder holds an address of the data holder where a piece of resultant data is stored, as well as a processor number that is related to the address and specifies one of the processors that provides the resultant data. The instruction issuer refers to the processor number when receiving, as the source data, one of resultant data pieces transmitted through the data forwarder.

The instruction issuer uses the processor number to select one of resultant data addresses sent from the processors through the data forwarder and compares the selected address with the address of required source data. If the addresses agree with each other, the instruction issuer fetches, as the source data, resultant data sent from the processor that provides the selected address.

When issuing instructions with source data to the processors, the instruction issuer sends, for each of the issued instructions, a processor number and a resultant data address to the data state holder.

DETAILED DESCRIPTION OF THE EMBODIMENTS

Figure 3:
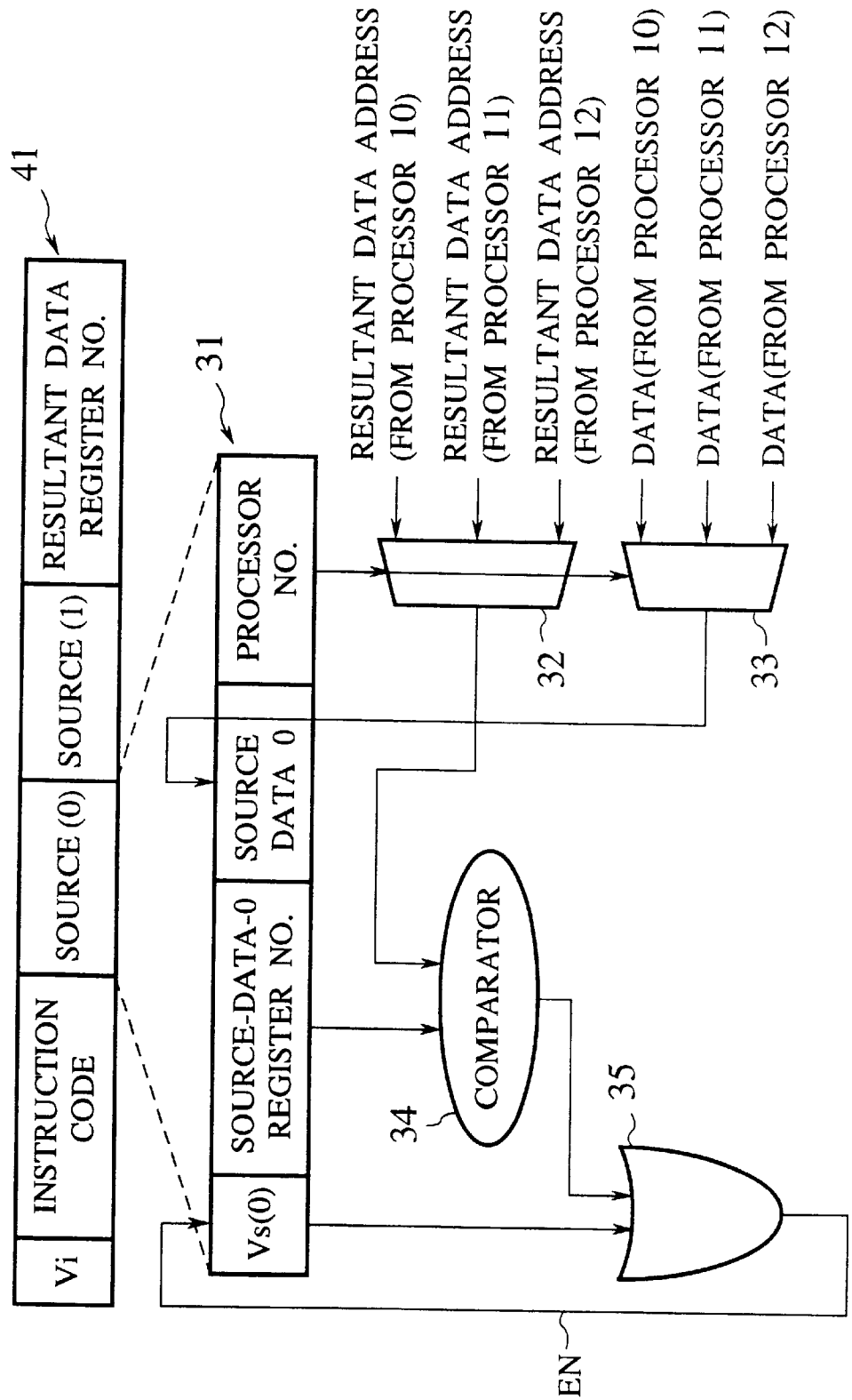
FIG. 3 is a block diagram showing an instruction queue incorporated in an instruction issuer 26 according to an embodiment of the present invention.

The embodiments of the present invention will be explained with reference to the accompanying drawings. FIG. 3 is a block diagram showing an instruction queue incorporated in an instruction issuer, and FIG. 4 is a block diagram showing a parallel processing unit having the instruction issuer according to an embodiment of the present invention.

In this embodiment, the parallel processing unit employs the out-of-order instruction issuing technique to simultaneously issue two instructions, and there are three processors that execute instructions in parallel. For the sake of simplicity of explanation, the register renaming technique is not used in this embodiment. A data cache is included in the processors 10 to 12.

Figure 4:
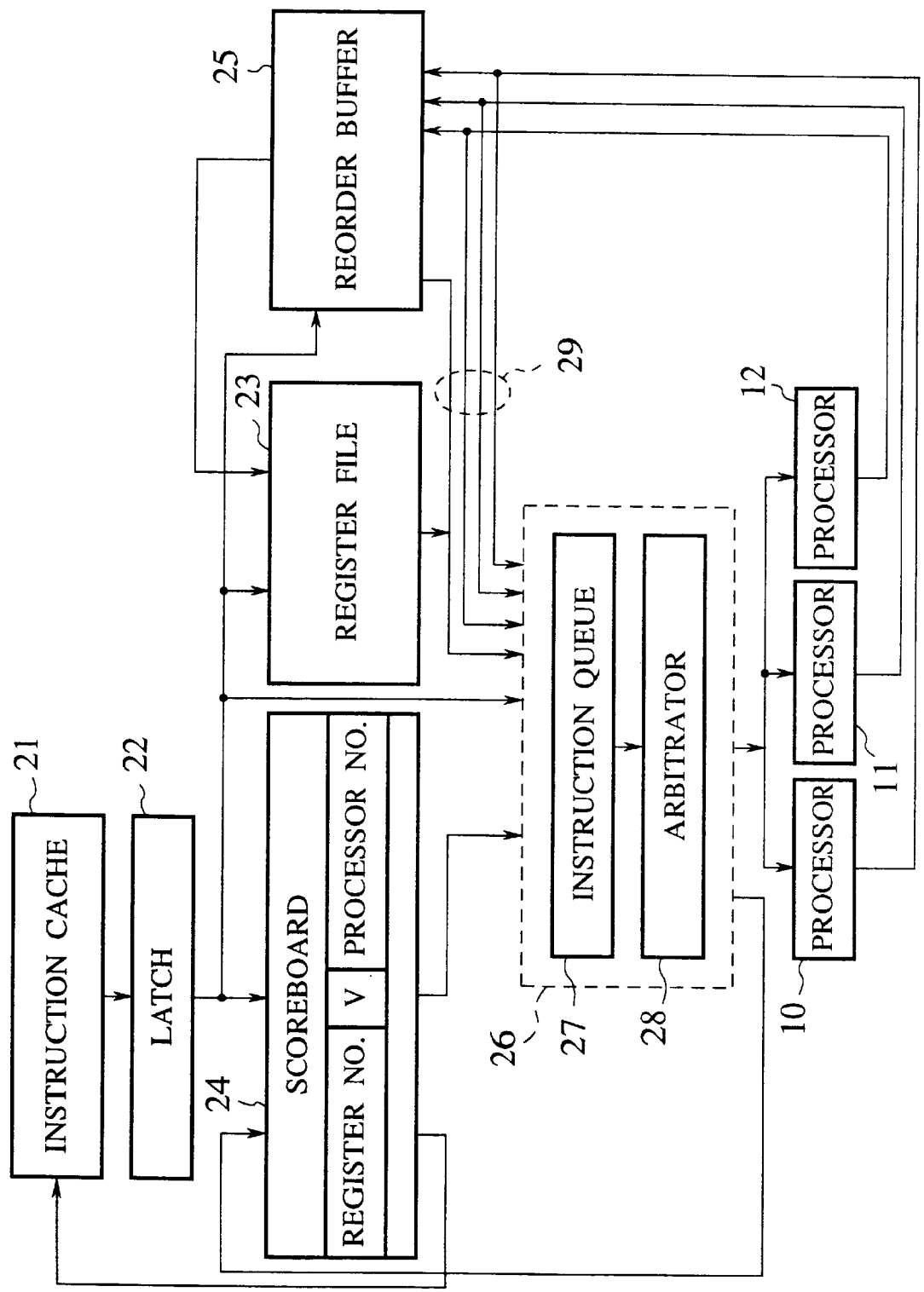
FIG. 4 is a block diagram showing a parallel processing unit incorporating the instruction issuer 26 of FIG. 3.

In FIG. 4, the parallel processing unit has an instruction cache 21 for storing instructions and a latch 22 for temporarily holding an instruction read out of the instruction cache 21. The output of the latch 22 is connected to a register file 23 serving as a data holder, a scoreboard 24 serving as a data state holder, a reorder buffer 25, and the instruction issuer 26.

Each instruction read out of the instruction cache 21 consists of an instruction code, a register number for source data 0, a register number for source data 1, and a register number for resultant data. The source-data-0 and source-data-1 register numbers are addresses of the register file 23 where the source data 0 and 1 are stored, and the source data 0 and 1 are necessary for executing the instruction. The resultant data register number is an address of the register file 23 where a result of execution of the instruction executed by one of the processors 10 to 12 is stored. The number of instructions read out of the instruction cache 21 may be one or more. A superscalar architecture simultaneously reads a plurality of instructions out of the instruction cache 21.

The register file 23 contains registers that store execution results provided by the processors 10 to 12. According to the present invention, the scoreboard 24 stores addresses, i.e., register numbers of the register file 23 as well as processor numbers related to the register numbers. Each processor number in the scoreboard 24 represents one of the processors 10 to 12 that processes data to be stored in a register whose register number is related to the processor number. The reorder buffer 25 rearranges resultant data of instructions executed by the processors 10 to 12 according to a stream of the instructions and writes the rearranged resultant data into the register file 23.

The instruction issuer 26 issues instructions to the processors 10 to 12 and has an instruction queue 27 and an arbitrator 28.

Each of the processors 10 to 12 fetches an instruction from the instruction issuer 26, executes the instruction, and sends resultant data to the reorder buffer 25 as well as to the instruction queue 27 through a data forwarding path 29.

Figure 5:
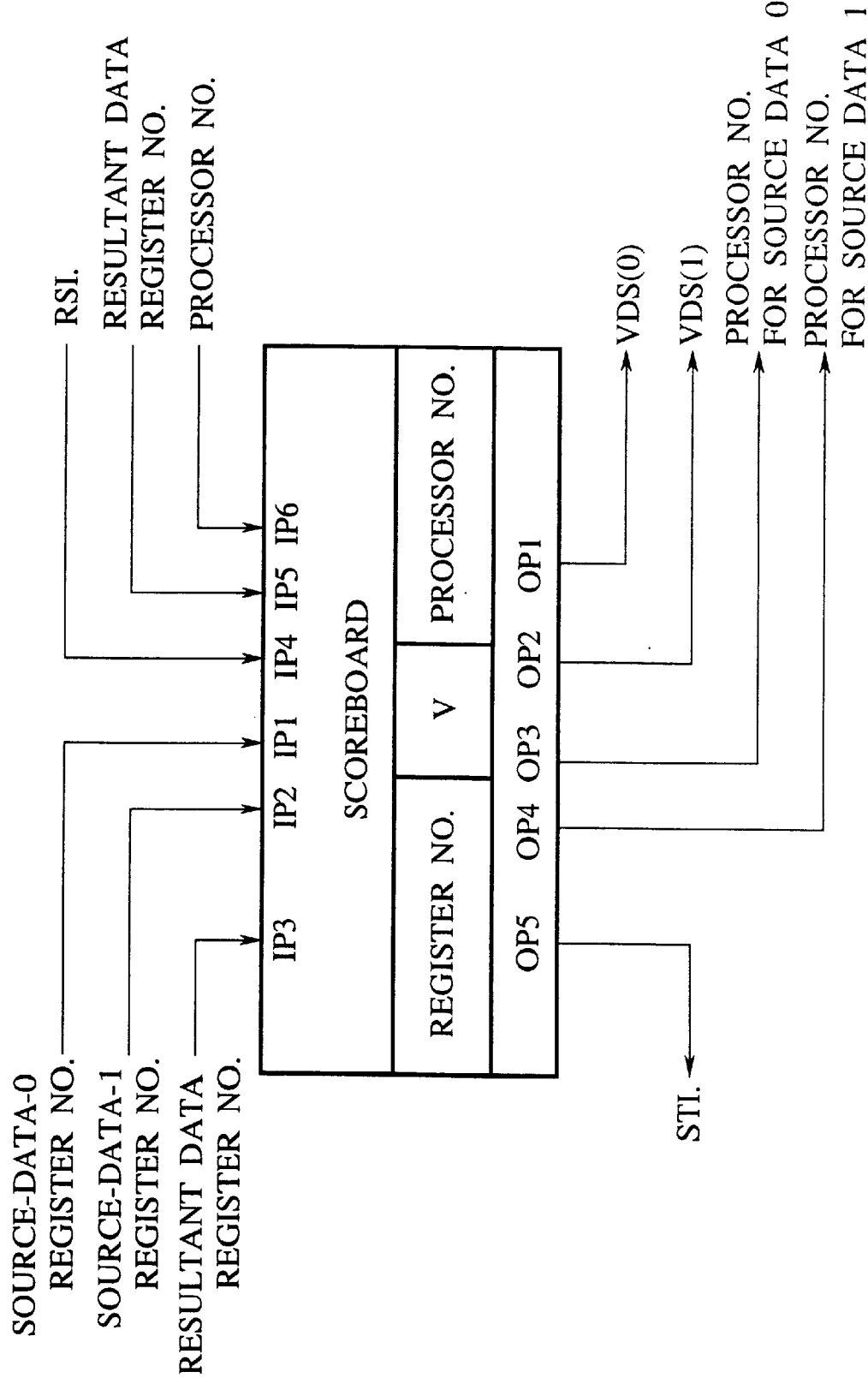
FIG. 5 shows a scoreboard 24 in the unit of FIG. 4.

FIG. 5 shows the structure of the scoreboard 24 with I/O ports for one instruction.

For each instruction stored, the scoreboard 24 has fields for storing a register number for source data 0, a register number for source data 1, and a register number for resultant data. Each of these fields further includes a busy flag V to indicate whether or not related data is being processed in one of the processors 10 to 12, and a processor number.

For each instruction, the scoreboard 24 has input ports IP1, IP2, and IP3 for receiving a register number for source data 0, a register number for source data 1, and a register number for resultant data. It also has an input port IP4 for receiving a reset signal RST to reset the source-data-0, source-data-1, and resultant data register numbers, and input ports IP5 and IP6 for setting a register number for resultant data and a processor number. The input ports IP1, IP2, and IP3 are connected to the output side of the instruction cache 21, and the input ports IP4, IP5, and IP6 are connected to the output side of the instruction issuer 26.

The scoreboard 24 also has output ports OP1 and OP2 for providing the instruction issuer 26 with source data validity signals VDS(0) and VDS(1) corresponding to source-data-0 and source-data-1 register numbers. The scoreboard 24 also has output ports OP3 and OP4 for providing the instruction issuer 26 with processor numbers for source data 0 and 1. The scoreboard 24 further has an output port OP5 for providing the instruction cache 21 with a stall signal STL for stopping an instruction read operation on a write/read conflict.

Although FIG. 5 shows I/O ports for one instruction, the scoreboard 24 actually has the input ports IP1 to IP3 and output ports OP1 to OP4 for each of the instructions to be simultaneously supplied to the instruction issuer 26, and the input ports IP4 to IP6 for each of the instructions to be simultaneously issued by the instruction issuer 26.

Each entry of the scoreboard 24 holds a register number, and therefore, is externally accessible by entering a register number. Namely, the scoreboard 24 is a content-addressable memory (CAM). The number of entries thereof is equal to the number of instructions queued in the instruction queue 27.

Figure 6:
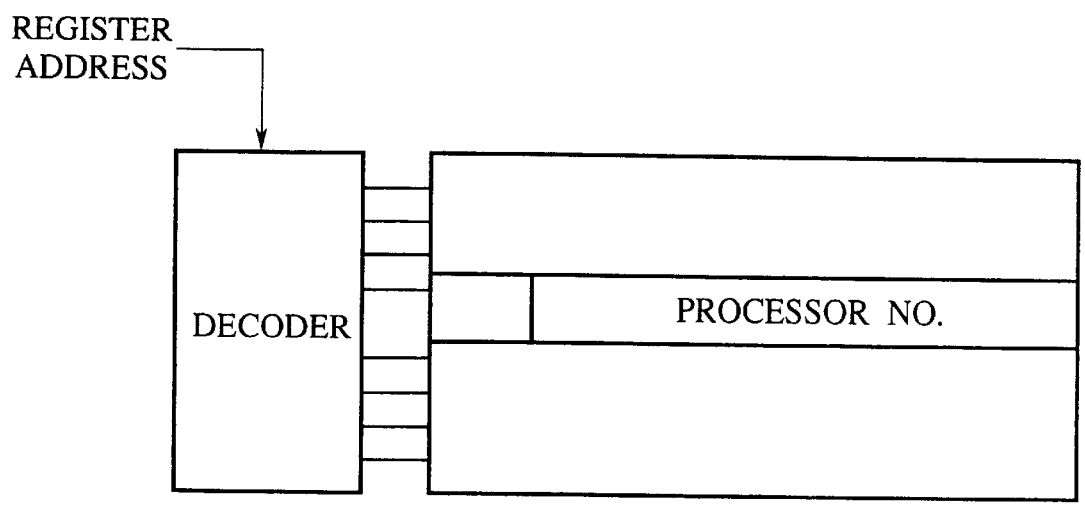
FIG. 6 shows a modification of the scoreboard 24.

As shown in FIG. 6, the number of entries of the scoreboard 24 may be equal to the number of registers in the register file 23 so that the entries and the registers may have a 1-to-1 relationship. In this case, the entries are accessed by decoding a given register number, and therefore, the scoreboard 24 is not required to have areas to store register numbers.

The instruction queue 27 incorporated in the instruction issuer 26 will be explained with reference to FIG. 3.

The instruction queue 27 has a source data holder 31 for each source data piece. Each source data holder 31 involves an address selector 32, a data selector 33, an address comparator 34, and an OR gate 35.

The instruction queue 27 has a field 41 for each of the queued instructions. The field 41 includes a validity flag Vi, an instruction code, a source-data-0 section, a source-data-1 section, and a register number for resultant data. Each of the source-data-0 and source-data-1 sections is connected to the source data holder 31. For example, the source data holder 31 for the source-data-0 section stores a source data validity flag Vs(0), a source-data-0 register number, source data 0, and a processor number. The flag Vs(0) is set in response to the validity signal VDS(0) from the scoreboard 24. If the flag Vs(0) is set, the source data 0 is valid.

The address selector 32 and data selector 33 use the processor number stored in the source data holder 31 as a select signal. The address selector 32 and data selector 33 receive resultant data and resultant data register numbers from the processors 10 to 12 through the data forwarding path 29.

The address comparator 34 compares a register number selected by the address selector 32 with the source-data-0 register number stored in the source data holder 31 and provides a comparison result. The comparison result is supplied to the OR gate 35, which provides an enable signal EN to set/reset the flag Vs(0). Namely, if the comparison result indicates that the compared register numbers agree with each other, the flag Vs(0) is set so that resultant data selected by the data selector 33 is stored as the source data 0 in the source data holder 31.

Figure 7:
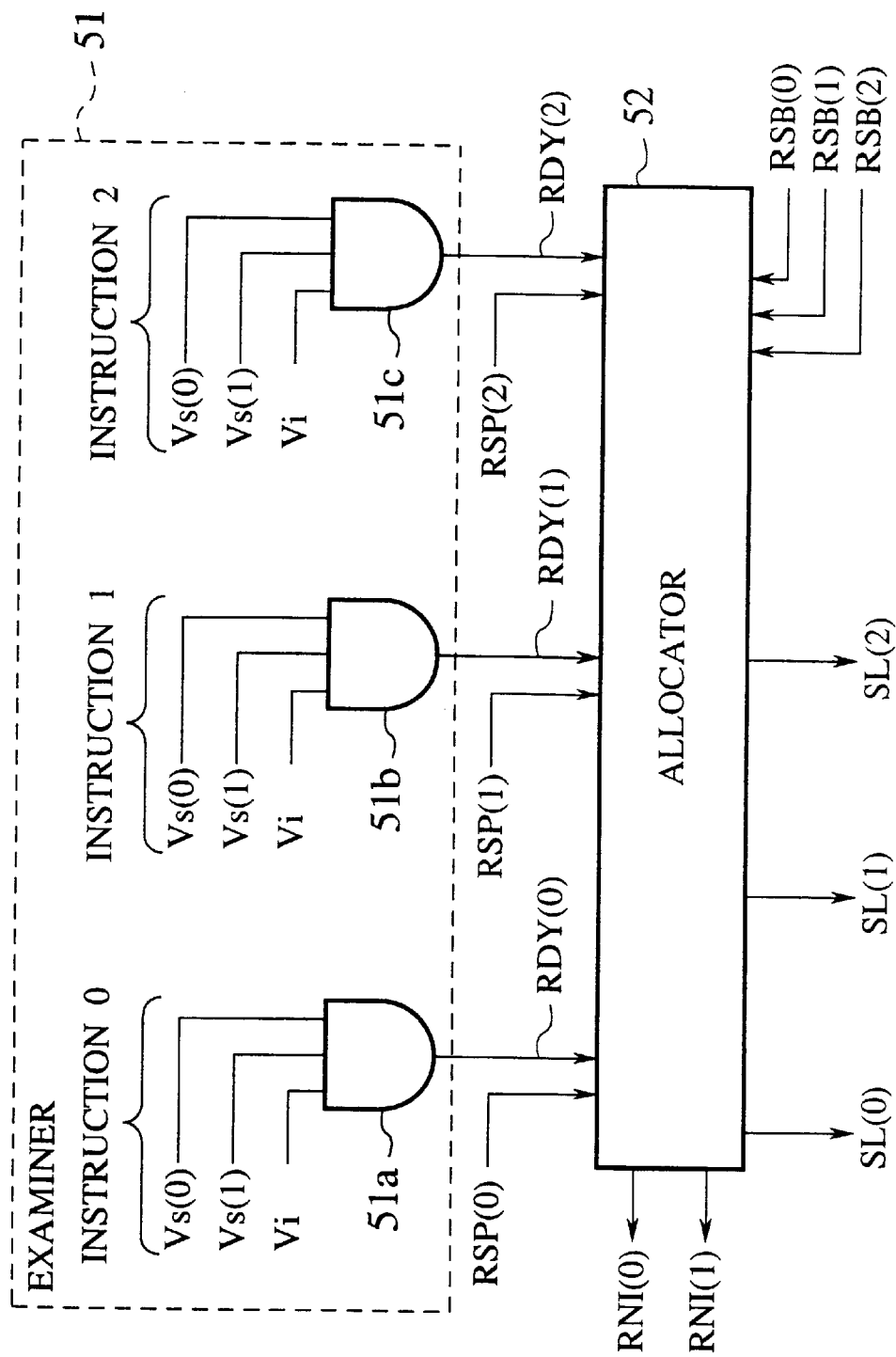
FIG. 7 is a block diagram showing an arbitrator 28 incorporated in the instruction issuer 26.

FIG. 7 is a block diagram showing the arbitrator 28 incorporated in the instruction issuer 26.

For the sake of simplicity of explanation, the arbitrator 28 of this embodiment simultaneously examines three instructions to see whether or not they are ready and simultaneously issues two instructions. The arbitrator 28 consists of an examiner 51 for determining whether or not instructions are ready to be issued, and an allocator 52 for allocating instructions to the processors.

It may be ideal to examine all instructions held in the instruction queue 27 to see whether or not they are simultaneously issuable. It is preferable to set the number of instructions to be examined for simultaneous issuance to two to three times the number of instructions to be simultaneously issued.

The examiner 51 simultaneously examines, for example, instructions 0, 1, and 2 among instructions stored in the instruction queue 27 to see if all source data for the instructions are ready. For this purpose, the examiner 51 calculates an AND of the validity flag Vi of a given instruction and validity flags Vs(0) and Vs(1) for source data 0 and 1 of the instruction. To examine three instructions at a time, the examiner 51 has three AND gates 51a, 51b, and 51c, which provide ready signals RDY(0), RDY(1), and RDY(2) to indicate whether or not the instructions are issuable.

The number of instructions to be examined at a time may be increased more than three by increasing the number of AND gates and by adjusting the allocator 52 accordingly.

The allocator 52 receives the ready signals RDY(0) to RDY(2) from the AND gates 51a to 51c, resource types RSP(0), RSP(1), and RSP(2) indicating multiplication, addition, subtraction, etc., performed by the instructions 0 to 2, and resource busy signals RSB(0), RSB(1), and RSB(2) that are provided by the processors 10 to 12 to indicate whether or not they are prepared to accept instructions.

Figure 9:
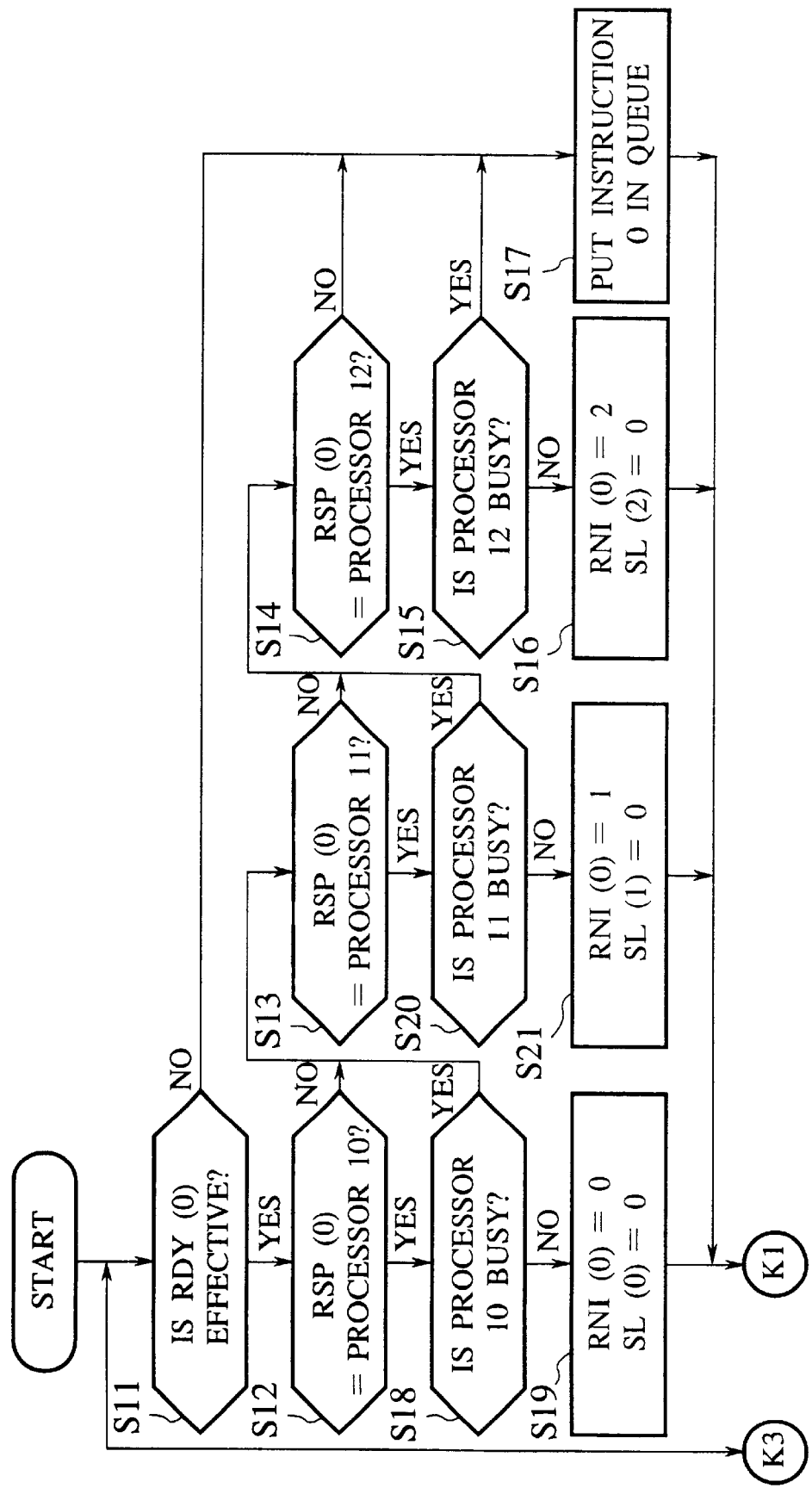
FIGS. 9 to 11 are flowcharts showing an algorithm carried out by the arbitrator 28.
Figure 10:
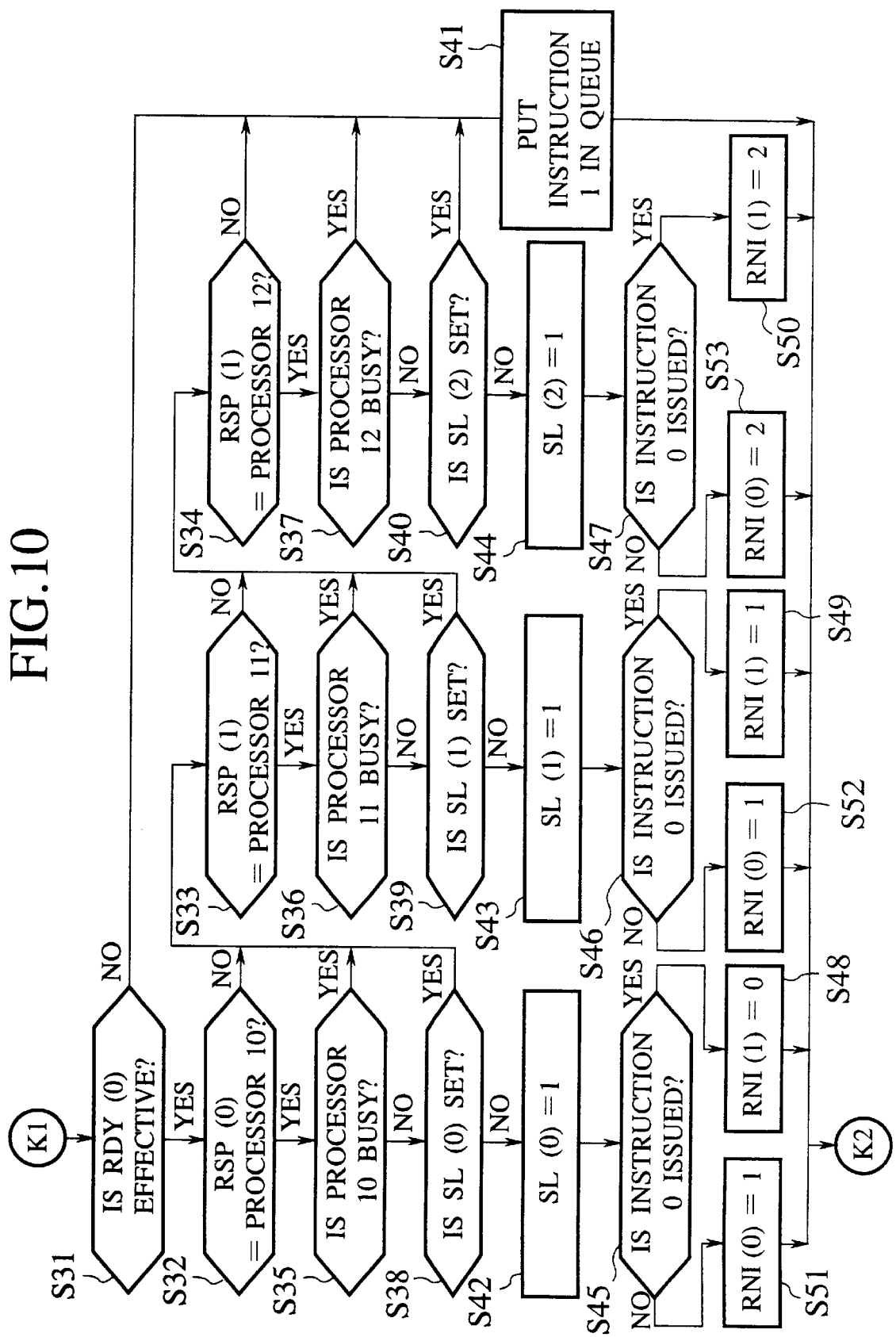
Figure 11:
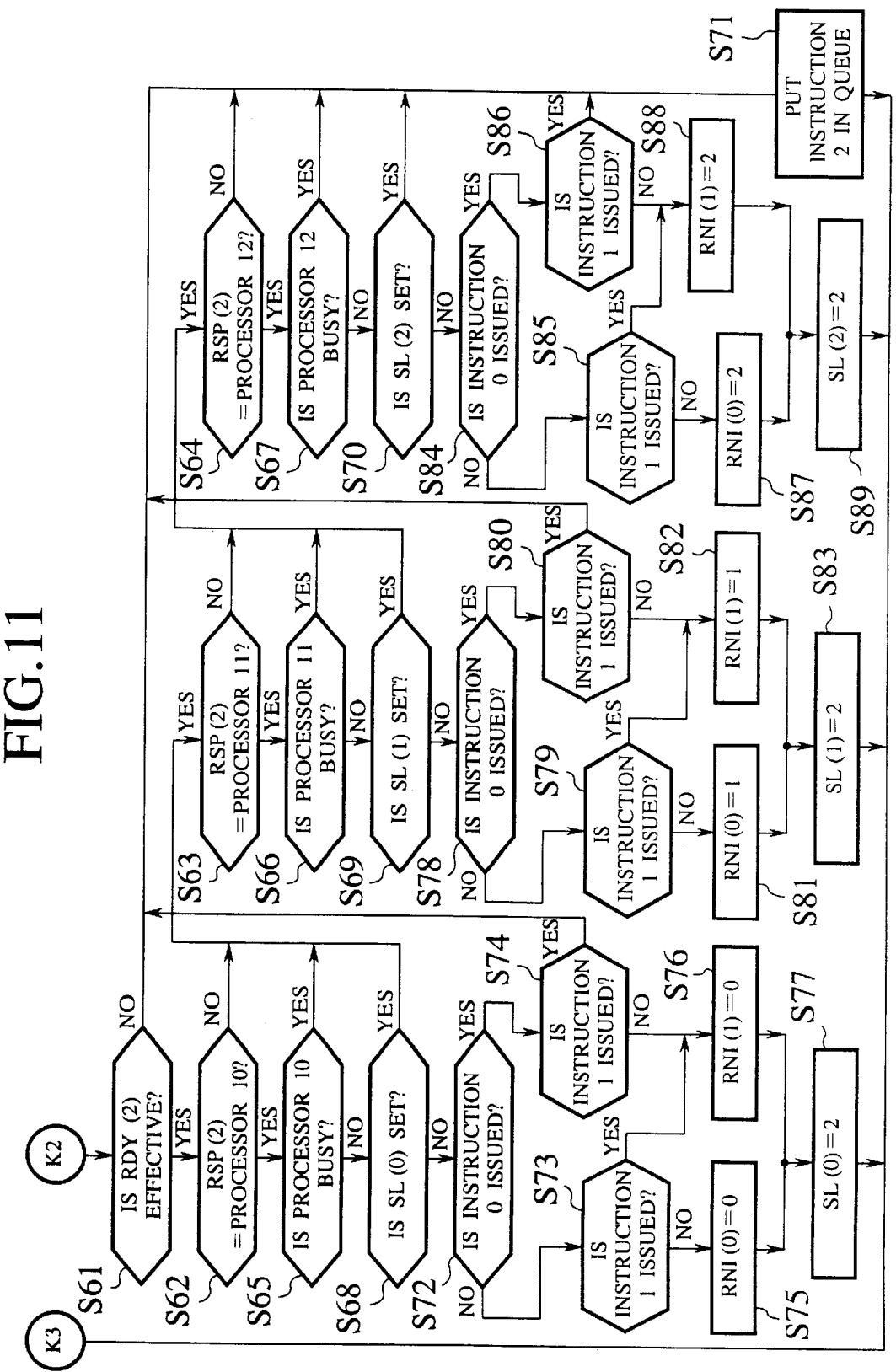

According to these signals, the allocator 52 carries out an algorithm shown in FIGS. 9 to 11 and provides instruction select signals SL(0), SL(1), and SL(2), and signals RNI(0) and RNI(1) each containing a processor number and a resultant data register number.

Figure 8:
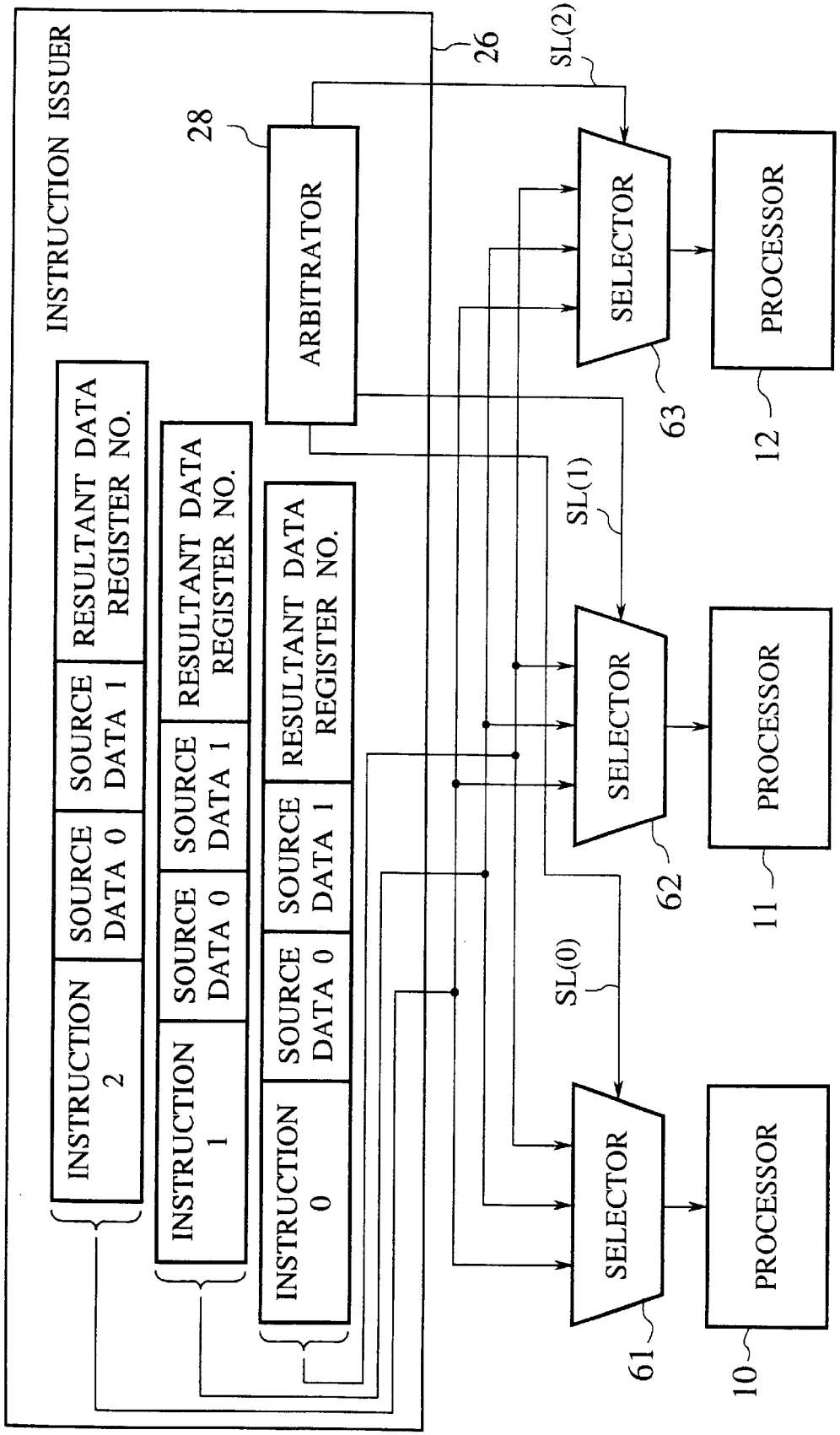
FIG. 8 shows connections between the instruction issuer 26 and processors 10 to 12.

FIG. 8 shows connections between the instruction issuer 26 and the processors 10 to 12.

Selectors 61, 62, and 63 are arranged between the instruction issuer 26 and the processors 10 to 12. Each of the selectors 61 to 63 receives ready instructions from the instruction queue 27, selects one of them according to a corresponding one of the instruction select signals SL(0) to SL(2), and sends the selected one to a corresponding one of the processors 10 to 12.

A flow of processes in the parallel processing unit having the above-mentioned components will be explained.

When an instruction is read out of the instruction cache 21, source register numbers related to the instruction are sent to the register file 23, scoreboard 24, and reorder buffer 25.

The operation of the scoreboard 24 on a given instruction will be explained. Upon receiving source-data-0 and source-data-1 register numbers of the instruction, the scoreboard 24 checks a busy flag V of each of the register numbers. If this flag is set, corresponding source data is being processed in one of the processors 10 to 12. For example, if the busy flag V for the source-data-0 register number is set, the scoreboard 24 provides the instruction issuer 26 with an invalid source data validity signal VDS(0) and a processor number of the processor that is processing the source data 0. The same processes take place on the source-data-1 register number.

The scoreboard 24 also receives a resultant data register number of the instruction. If a busy flag V for this register number is set, the scoreboard 24 provides a stall signal STL to indicate that there is a write/read conflict. If this flag V is not set, the scoreboard 24 sets the flag upon receiving the resultant data register number. The determination of a write/read conflict and the timing of setting the flag V are dependent on the architecture of the parallel processing unit. In this embodiment, the busy flag V is set when a first instruction is set in the scoreboard 24.

If the source data validity signal VDS(0) indicates validity, the source data 0 stored at the source-data-0 register number in the register file 23 and reorder buffer 25 is valid and is transferred to the instruction issuer 26. If the reorder buffer 25 stores the same data, it will be the latest valid data and will be given priority over the data stored in the register file 23.

Signals and data from the scoreboard 24, register file 23, and reorder buffer 25 are stored in the instruction queue 27 in the instruction issuer 26. Each instruction in the instruction queue 27 has a source-data-0 field and a source-data-1 field having source data validity flags Vs(0) and Vs(1), respectively. If these flags are set, the source data are valid, and if not, the instruction queue 27 monitors addresses (register numbers) and data transmitted through the path 29.

Since this embodiment employs three processors, the number of addresses and data pieces transmitted through the path 29 are each three. In FIG. 3, the selectors 32 and 33 select, according to a processor number, one address and one data piece among the three addresses and three data pieces transmitted through the path 29. The comparator 34 compares the selected address with a source-data-0 register number stored in the source data holder 31. If they agree with each other, the flag Vs(0) is set, and at the same time, the selected data is stored as the source data 0. The same processes are carried out on the source data 1. In this embodiment, each instruction involves two pieces of source data, i.e., source data 0 and source data 1, and the above processes are carried out on each source data piece of each queued instruction.

When the source data 0 and source data 1 become valid, the examiner 51 of the arbitrator 28 determines that the instruction in question is ready for issuance. Then, the allocator 52 allocates the instruction to one of the processors 10 to 12 according to the algorithm mentioned below.

FIGS. 9 to 11 are flowcharts showing the algorithm executed by the arbitrator 28. These flowcharts are continuous to one another. Namely, FIG. 9 continues to FIG. 10 through a contact mark K1, FIG. 10 to FIG. 11 through a contact mark K2, and FIG. 9 to FIG. 11 through a contact mark K3.

In this embodiment, the number of instructions to be simultaneously examined for issuance is three, and the number of instructions to be simultaneously issued is two. The priority of instructions 0, 1, and 2 in an instruction stream is in order of 0, 1, and 2. Namely, the instruction 0 is first processed between the instructions 0 and 1, and the instruction 1 is first processed between the instructions 1 and 2. For the sake of convenience, processor numbers 0, 1, and 2 are allocated to the processors 10, 11, and 12, respectively.

In FIG. 9, the arbitrator 28 checks the instruction 0 to see if it is issuable. If the ready signal RDY(0) of FIG. 7 is valid in step S11, the instruction 0 is issuable, and steps S12, S13, and S14 compare the resource type of the instruction 0 with the types of the processors 10 to 12.

Suppose the processors 10 and 11 are each an ALU and the processor 12 is a multiplier. If the instruction 0 is a multiplication instruction, the processor 12 is selected as an issuance target. If the processor 12 is not busy in step S15, it is selected as an issuance target. Then, the instruction select signal SL(2) for the processor 12 becomes 0 to select the instruction 0. A processor number to be written into the scoreboard 24 is set to 2. The processor number of 2 and a resultant data register number are set in the signal RNI(0) in step S16. If the processor 12 is busy, the instruction 0 is queued in step S17.

If the processor 10 is selected as an issuance target in step S18, the instruction select signal SL(0) for the processor 10 becomes 0 to select the instruction 0. Then, a processor number of 0 and a resultant data register number are set in the signal RNI(0) in step S19. The signal RNI(0) is transmitted to the scoreboard 24.

If the processor 11 is selected as an issuance target in step S20, the instruction select signal SL(1) for the processor 11 becomes 0 to select the instruction 0. A processor number of 1 and a resultant data register number are set in the signal RNI(0) in step S21. The signal RNI(0) is transmitted to the scoreboard 24. If the processor 11 is busy, the processor 12 is examined.

In FIG. 10, the instruction 1 is checked. If the instruction 1 is issuable in step S31, a processor to which the instruction 1 is issued is selected in steps S32, S33, and S34. If all of the processors 10 to 12 are busy in steps S35, S36, and S37, or if the target processor is already the target of the instruction 0, i.e., if one of the instruction select signals SL(0), SL(1), and SL(2) for the target processor is already 0 in steps S38, S39, and S40, the instruction 1 is queued in step S41.

For example, if the instruction 0 is a multiplication instruction and the instruction 1 is also a multiplication instruction and if the processor 12, which is a multiplier, is already allocated for the instruction 0, the instruction 1 is queued. If the instruction 0 is an ALU instruction and the instruction 1 is also an ALU instruction, the instruction 0 is assigned to the processor 10, and the instruction 1 is assignable to the processor 11. Namely, the instructions 0 and 1 are simultaneously issued.

Once the target processor for the instruction 1 is determined, the instruction select signal for the processor is set in steps S42, S43, and S44. At the same time, a processor number to be sent to the scoreboard 24 is set. If it is found in steps S45, S46, and S47 that the instruction 0 is going to be issued, the processor number and a resultant data register number for the instruction 1 are set in the signal RNI(1) in steps S48, S49, and S50. If the instruction 0 is not issued, they are set in the signal RNI(0) in steps S51, S52, and S53.

In FIG. 11, the instruction 2 is dependent on the instructions 0 and 1. If the instructions 0 and 1 are both issued, the instruction 2 must be queued even if it is ready for issuance. If one or both of the instructions 0 and 1 are not issued and if the instruction 2 is issuable, the instruction 2 is issued.

In FIG. 11, steps S61 to S71 are the same as steps S31 to S41 of FIG. 10. If step S68 determines that the instruction signal SL(0) is not set, step S72 is carried out to determine whether or not the instruction 0 is issued. Irrespective of the result of step S72, steps S73 and S74 determine whether or not the instruction 1 is issued. If step S73 determines that the instruction 1 is not issued, step S75 sets a processor number of 0 and a target register number in the signal RNI(0) to be sent to the scoreboard 24. If step S73 determines that the instruction 1 is issued, or if step S74 determines that the instruction 1 is not issued, step S76 sets the processor number of 0 and target register number in the signal RNI(1) to be sent to the scoreboard 24. After steps S75 and S76, step S77 sets the instruction select signal SL(0) for the processor 10 to 2 to select the instruction 2. If step S74 determines that the instruction 1 is issued, the instruction 2 is queued in step S71.

If step 69 determines that the instruction select signal SL(1) is not set, steps S78 to S80 carry out the same processes as steps S72 to S74. Then, steps S81 and S82 set a processor number of 1 and a resultant data register number in the signal RNI(0) or RNI(1). Thereafter, step S83 sets the instruction select signal SL(1) for the processor 11 to 2 to select the instruction 2. If step S80 determines that the instruction 1 is issued, the instruction 2 is queued in step S71.

If step S70 determines that the instruction select signal SL(2) is not set, steps S84 to S86 carry out the same processes as steps S72 to S74. Steps S87 and S88 set a processor number of 2 and a resultant data register number in the signal RNI(0) or RNI(1). Thereafter, step S89 sets the instruction select signal SL(2) for the processor 12 to 2 to select the instruction 2. If step S86 determines that the instruction 1 is issued, the instruction 2 is queued in step S71.

In this way, the signal that transfers a processor number of the instruction 2 to the scoreboard 24 is dependent on the issuable states of the instructions 0 and 1. In this embodiment, the signal RNI(1) may always be used without trouble when the instruction 2 is issuable. The algorithm of FIGS. 9 to 11 is expandable to handle a case of, for example, the number of instructions to be simultaneously issued being four and the number of instructions to be simultaneously examined being eight, The numbers of instructions to be simultaneously examined and issued are dependent on the degree of parallelism of a program, the number of processors, etc. After instructions are issued, empty fields are filled with other instructions. For example, if only the instruction 0 is issued, the instruction 1 is shifted to the space for the instruction 1, and the instruction 2 is shifted to the space for the instruction 1. Then, a new instruction is read into the space for the instruction 2. This results in maintaining the priority of instructions in the instruction issuer 26.

When an instruction is issued, the signal RNI(0) or RNI(1) is transmitted to the scoreboard 24, to set a processor number therein according to a resultant data register number transmitted with the signal RNI(0) or RNI(1). If the next instruction uses the data at the resultant data register number as source data, the instruction issuer 26 fetches the corresponding processor number from the scoreboard 24.

The processors 10 to 12 fetch instructions according to the select signals SL(0), SL(1), and SL(2) provided by the instruction issuer 26. Resultant data from the processors 10 to 12 are sent with resultant data register numbers to the data forwarding path 29. If the next instruction needs one of these resultant data pieces, the instruction issuer 26 monitors the outputs of the processors 10 to 12, and if required data is found based on the resultant data register number related to the data, fetches the data.

The advantages of the present invention will be explained.

Figure 1:
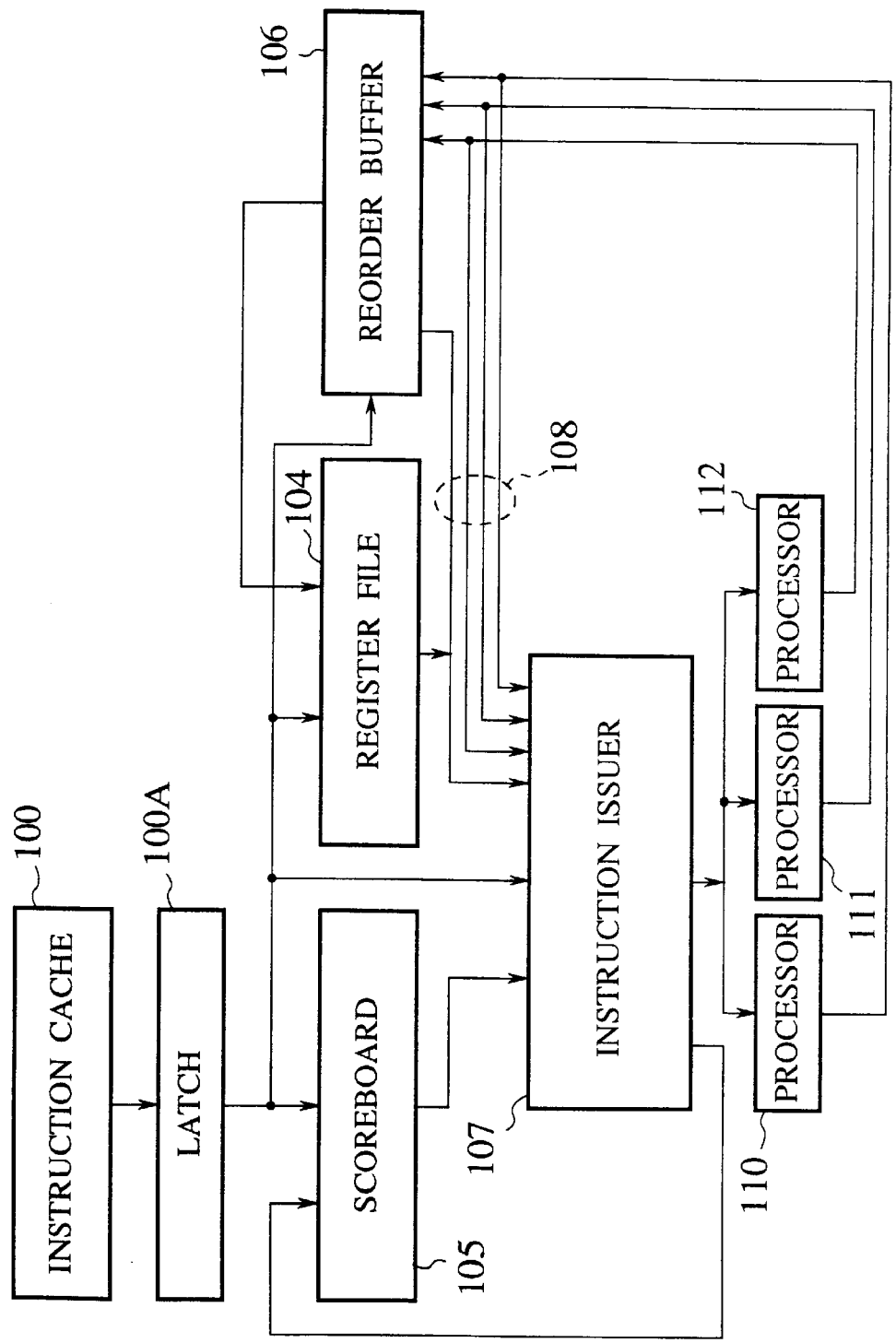
FIG. 1 is a block diagram showing a parallel processing unit according to prior art.
Figure 2:
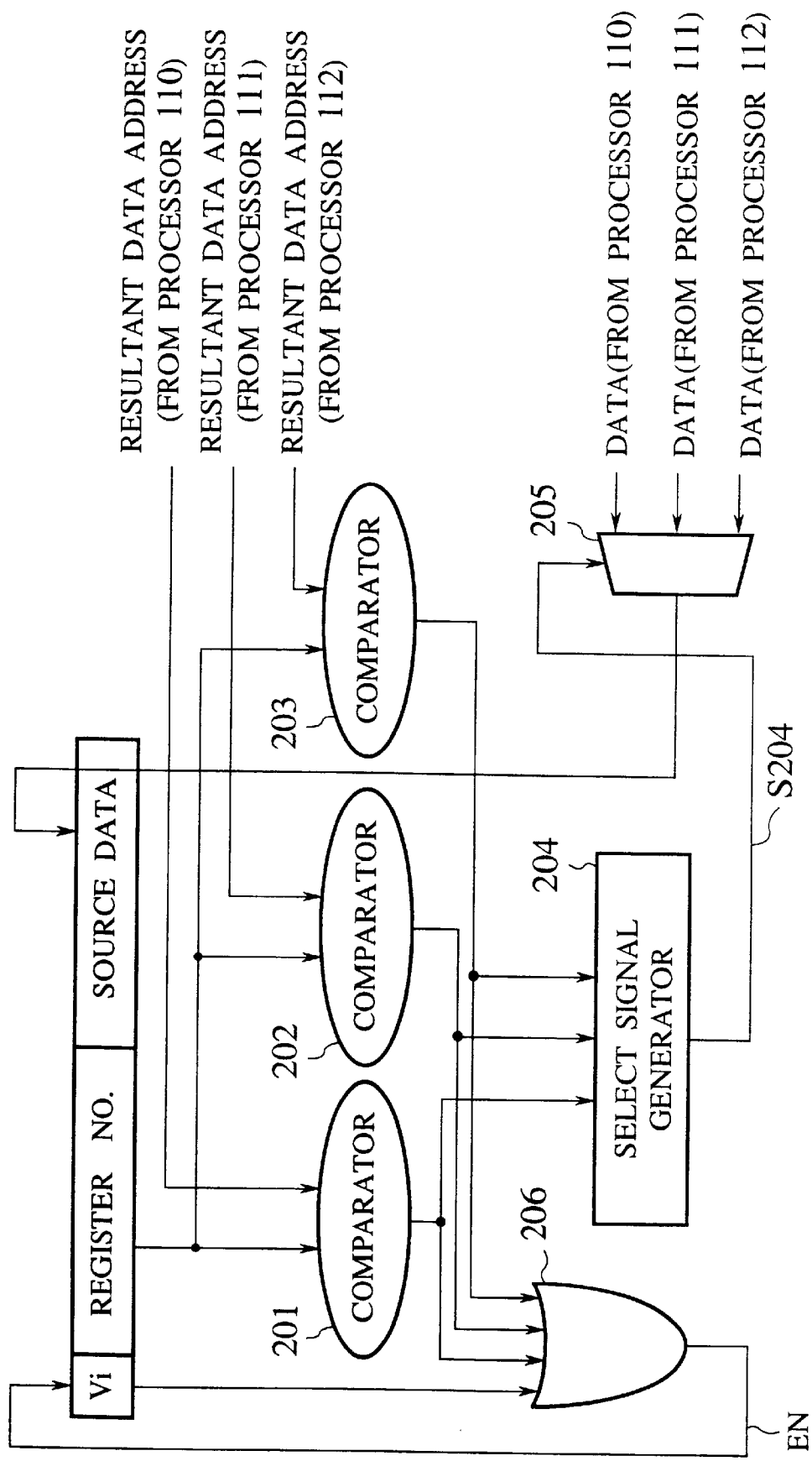
FIG. 2 is a block diagram showing an instruction queue incorporated in an instruction issuer of the unit of FIG. 1.

As is apparent from comparison between the embodiment of FIG. 3 and the prior art of FIG. 2, the instruction queue of the embodiment must additionally have the part for holding a processor number and the address selector 32 but involves reduced numbers of address comparators and enable signal generating OR circuits and no select signal generators of FIG. 2. In addition, the embodiment has a simple arrangement for generating an enable signal. Accordingly, the embodiment is quick to generate the enable signal and select data.

As explained above in detail, the present invention provides a parallel processing unit having an instruction issuer that employs the out-of-order instruction issuing technique and involves a small number of comparators, to greatly reduce the scale of a circuit that determines whether or not a given instruction must be queued, and improve an operation speed. This results in reducing load on the instruction issuer even if there are many instructions to be simultaneously issued and improving the performance of the parallel processing unit.

What is claimed is:

1. A parallel processing unit comprising:

a plurality of execution blocks for executing a plurality of instructions in parallel, each execution block being capable of receiving an instruction in a sequence;

a dispatch unit for dispatching an instruction with source information to said execution blocks when that instruction is ready to be executed, said source information includes:

source data to be processed; and register identification of resultant data to identify a register that said resultant data is stored;

a plurality of registers connected to said dispatch unit, for storing the source data and outputting the source data to said dispatch unit; and a data forwarding path connecting said execution blocks and said dispatch unit, for bypassing said registers;

wherein said dispatch unit comprises:

a source information holder having:

a first register identification storing unit for storing a register identification of source data;

a second register identification storing unit for storing a register identification of resultant data;

a source data storing unit for storing said source data; and an execution block number storing unit for storing an execution block identification;

an address selector connected to said execution block number storing unit and said plurality of execution blocks, wherein said address selector inputs a plurality of resultant data addresses from said execution blocks and outputs one of said resultant data addresses based on said execution block identification; and a comparator connected to said source data storing unit and said address selector, wherein said comparator compares source register identification stored in said source data storing unit with selected resultant data addresses, wherein said dispatch unit writes data from said execution block corresponding to said execution block identification to said source data storing unit.

2. The parallel processing unit as claimed in claim 1 further comprising a scoreboard, said scoreboard comprising:

a register identification storing unit for storing a plurality of register identifications to identify registers;

a busy flag storing unit for storing a busy flag to indicate whether source data stored in said register is being processed or not; and an execution block identification storing unit storing an execution block identification to identify an execution block that is processing said source data.

3. The parallel processing unit as claimed in claim 2 wherein said scoreboard further stores an identification reference to the registers for each entry of said source information.

4. The parallel processing unit as claimed in claim 2 wherein said scoreboard further stores the entries of said source information and said registers in a one-to-one correspondence.

5. The parallel processing unit as claimed in claim 2 wherein, when an instruction is dispatched from said unit together with the source data, unit informs said scoreboard of said source information.

6. The parallel processing unit as claimed in claim 3 wherein, when an instruction is dispatched from said unit together with the source data, said unit informs said scoreboard of said source information.

7. The parallel processing unit as claimed in claim 2, wherein said dispatch unit outputs said register identification and said execution block identification to said scoreboard, and wherein said execution block identification is stored to said execution block identification storing unit corresponding to said register identification.

* * * * *